United States Patent
Xu et al.

(10) Patent No.: US 9,958,980 B2
(45) Date of Patent: May 1, 2018

(54) DRIVING METHOD AND DRIVING DEVICE OF TOUCH CONTROL DISPLAY

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shuai Xu, Beijing (CN); Yao Yu, Beijing (CN); Zhengxin Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 285 days.

(21) Appl. No.: 14/354,763

(22) PCT Filed: May 30, 2013

(86) PCT No.: PCT/CN2013/076497
§ 371 (c)(1),
(2) Date: Apr. 28, 2014

(87) PCT Pub. No.: WO2014/139218
PCT Pub. Date: Sep. 18, 2014

(65) Prior Publication Data
US 2015/0301676 A1  Oct. 22, 2015

(30) Foreign Application Priority Data
Mar. 13, 2013 (CN) .......................... 2013 1 0079466

(51) Int. Cl.
G06F 3/041 (2006.01)
G06F 3/044 (2006.01)
G06F 3/045 (2006.01)

(52) U.S. Cl.
CPC ............ G06F 3/0416 (2013.01); G06F 3/041 (2013.01); G06F 3/044 (2013.01); G06F 3/045 (2013.01);
(Continued)

(58) Field of Classification Search
CPC ........ G06F 3/046; G06F 3/0412; G06F 3/044; G06F 3/045; G06F 3/0416
See application file for complete search history.

(56) References Cited

U.S. PATENT DOCUMENTS

2006/0192766 A1* 8/2006 Nakamura ............ G06F 3/0421
345/173
2010/0085492 A1* 4/2010 Shiomi ................ G09G 3/2077
348/790

(Continued)

FOREIGN PATENT DOCUMENTS

CN  1815314 A  8/2006
CN  101105915 A  1/2008
(Continued)

OTHER PUBLICATIONS

International Preliminary Report on Patentability dated Sep. 15, 2015; PCT/CN2013/076497.
(Continued)

Primary Examiner — Kent Chang
Assistant Examiner — Scott Au
(74) Attorney, Agent, or Firm — Ladas & Parry LLP

(57) ABSTRACT

The present invention discloses a driving method and device of a touch control display configured to resolve the problems such as image smearing and jittering caused by the touch control displaying during the image displaying by the display with the touch functions. The driving method of the touch control display includes: detecting whether or not a touch currently occurs on the touch control panel after the touch control display panel displaying the present image frame and before displaying the next image frame; when a occurred touch event is detected, controlling the display panel to display the inserted image with equal grayscale for each pixel of the display during a prescribed period; and
(Continued)

controlling the touch control panel to execute the touch control command based on the touch signal corresponding to the occurred touch event.

17 Claims, 3 Drawing Sheets

(52) U.S. Cl.
CPC .. *G06F 3/0412* (2013.01); *G06F 2203/04101* (2013.01); *G06F 2203/04113* (2013.01)

(56) References Cited

U.S. PATENT DOCUMENTS

| | | | | |
|---|---|---|---|---|
| 2011/0216039 | A1* | 9/2011 | Chen | G06F 3/0412 345/174 |
| 2012/0133658 | A1* | 5/2012 | Mori | G06T 13/80 345/473 |
| 2013/0100150 | A1* | 4/2013 | Kurikko | G09G 3/20 345/545 |
| 2014/0340340 | A1* | 11/2014 | Tsai | G06F 3/044 345/173 |

FOREIGN PATENT DOCUMENTS

| | | |
|---|---|---|
| CN | 101295474 A | 10/2008 |
| CN | 101673528 A | 3/2010 |
| CN | 102945093 A | 2/2013 |

OTHER PUBLICATIONS

Second Chinese Office Action dated Sep. 15, 2015; Appln. No. 201310079466.0.
First Chinese Office Action Appln. No. 201310079466.0; dated Apr. 22, 2015.
International Search Report dated Dec. 19, 2013; PCT/CN2013/076497.

* cited by examiner

DRIVING METHOD AND DRIVING DEVICE OF TOUCH CONTROL DISPLAY

TECHNICAL FIELD

The present disclosure relates to a field of touch control display technology, and in particular to a driving method and a driving device of a touch control display.

BACKGROUND

A touch control panel (TP) as an input device is integrated together with a display panel to form a touch control display. The touch control display plays important roles in the field of touch control displaying.

The touch control display may be divided into a built-in type and an external type. The built-in touch control display comprises a display panel and a circuit embedded into the display panel to achieve the touch control functionality, which together implements the touch and image display functions. The external touch control display comprises a touch control panel and a display panel independent of each other, and the touch control panel is located above the display panel.

The touch control panel generally comprises a touch control circuit and a processor. The touch control circuit detects a touch point location of a touch event, and the touch point location is sent to the processor as a touch signal by the touch control circuit. The processor processes the signal and sends the signal to a computer system after processing. The touch event corresponding to the touch signal is then interpreted as a corresponding executing operation by the computer system.

At present popular touch control technologies for a mobile apparatus comprise a resistive type and a capacitive type. In the resistive technology, the touch control circuit comprises two opposing layers of oxide conductive film applied on the touch control panel. When the touch control panel is touched, the two layers of conductive film contact, thereby one of the switches is turned off to record the location of the touch event, and a touch signal is sent to the processor for further processing. In the capacitive technology, when the touch control panel is touched, the capacitance on the touch point changes, the processor determines the location of the touch point by processing the touch signal corresponding to the capacitance changes.

For both the built-in and the external touch control display, when the processor is executing the touching command, if imaging response rate of the liquid crystal display is slow, the displayed image tends to have problems such as smearing and jittering, which severely affects the imaging quality of the display.

SUMMARY

The embodiments of the present invention provide a driving method and driving device of a touch control display for resolving the problems such as image smearing and jittering caused by touch during the image display in a display with touch control functionality.

The driving method of the touch control display according to the embodiments of the present invention comprises steps of: detecting whether or not a touch event occurs currently on the touch control panel of the touch control display after displaying a present image frame and before displaying a next image frame by driving the touch control display; controlling a display panel of the touch control display to display an inserted image with equal grayscale for each pixel of the display during a prescribed period if a touch event is detected; and controlling the touch control panel to execute the touch control command based on the touch control signal corresponding to the touch event.

For example, controlling the display panel to display the inserted image during a prescribed period comprises: controlling the display panel to display a black image or a white image during the prescribed period.

For example, controlling the display panel to display the inserted image during the prescribed period comprises: controlling the display panel to display a frame of the inserted image during a period corresponding to display the present image frame, or controlling the display panel to display the inserted image during a period corresponding to output one or more pulses by a gate driving circuit of the display panel.

For example, controlling the display panel to display the frame of the inserted image during the period corresponding to display the present image frame comprises: during the period corresponding to display the present image frame, controlling a source driving circuit of the display panel to in turn output an image data of a frame of the inserted image, and controlling a gate driving circuit of the display panel to scan line by line.

Controlling the display panel to display the inserted image during the period corresponding to output one or more pulses by the gate driving circuit comprises: during the period corresponding to output one or more pulses by the gate driving circuit, controlling a source driving circuit of the display panel to simultaneously output an image data of a frame of the inserted image to each data line of the display panel, and controlling the gate driving circuit to simultaneously scan each gate scan line of the display panel.

For example, controlling the display panel to display the inserted image during the prescribed period comprises: during the prescribed period in a null data stage after inputting an image data of a frame of the present image, controlling the display panel to display the inserted image, or after a null data stage after inputting the image data of a frame of the present image, controlling the display panel to display the inserted image.

For example, after controlling the touch control panel to execute the touch control command and before displaying the next image frame, the method further comprises: detecting whether or not the touch control command is finished, if the touch control command is not finished, continuously controlling the display panel to display the inserted image, until the touch control command is finished.

The embodiments of the present invention provide a driving device of a touch control display comprising: a detecting unit configured to detect whether or not a touch event occurs on a touch control panel of the touch control display after displaying a present image frame and before displaying a next image frame; an image inserting unit configured to control a display panel of the touch control display to display the inserted image with equal grayscale for each pixel of the display when a touch event is detected by the detecting unit; and a touch control executing unit configured to control the touch control panel to execute a touch control command based on the touch event.

For example, the image inserting unit is configured to control the display panel to display a black image or a white image during a prescribed period when the touch event is determined by the detecting unit.

For example, the image inserting unit controls the display panel to display a frame of an inserted image during a period corresponding to display the present image frame, the image inserting unit controls the display panel to display a frame of an inserted image during a period corresponding to output one or more pulses by a gate driving circuit of the display panel.

For example, controlling the display panel to display a frame of the inserted image during the period corresponding to display the present image frame comprises: during the period corresponding to display the present image frame, controlling a source driving circuit of the display panel to in turn output the image data of a frame of the inserted image, and controlling the gate driving circuit to scan line by line.

Controlling the display panel to display the inserted image during the period corresponding to output the one or more pulses by the gate driving circuit comprises: during the period corresponding to output the one or more pulses by the gate driving circuit, controlling a source driving circuit of the display panel to simultaneously output the image data of a frame of the inserted image to each data line of the display panel, and controlling the gate driving circuit to simultaneously scan each gate scan line of the display panel.

For example, the image inserting unit controls the display panel to display the inserted image during the prescribed period in a null data stage after inputting the image data of the frame of the inserted image, or the image inserting unit controls the display panel to display the inserted image after a null data stage after inputting the image data of a frame of the inserted image.

For example, the touch control executing unit is further configured to detect whether or not the touch control command is finished after controlling the touch control panel to execute the touch control command and before displaying the next image frame, if the touch control command is not finished, then the touch control executing unit continuously controls the display panel to display the inserted image until the touch control command is finished. The driving method and driving device of the touch control display according to the embodiments of the present invention may avoid the problem such as the image jittering and smearing caused by the touch during the image displaying by the display with the touch functionality.

BRIEF DESCRIPTION OF THE DRAWINGS

In order to illustrate the technical solution of the embodiments of the invention more clearly, the drawings of the embodiments will be briefly described as below; it is obvious that the drawings as described below are only related to some embodiments of the invention, but not limitative of the invention.

DETAILED DESCRIPTION

Figure 1:
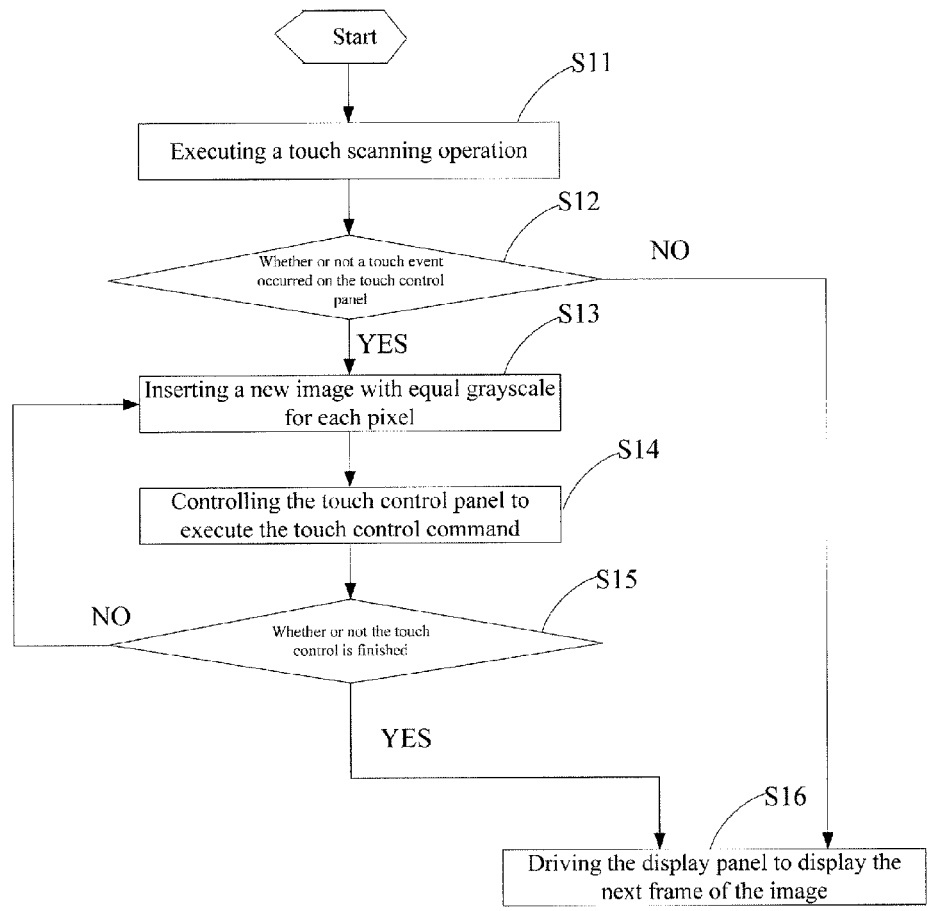
FIG. 1 is a flow chart of a driving method of the touch control display according to an embodiment of the present invention.

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention.

Unless otherwise defined, the technical terminology or scientific terminology used herein should have the same meaning as commonly understood by one of ordinary skill in the art to which this invention belongs. "First", "second" and the like used in specification and claims of the patent application of the invention do not show any order, number or importance, but are only used to distinguish different constituent parts. Likewise, terms such "a," "an," "the" or the like does not indicate limitation in number, but specifies the presence of at least one. The term such as "comprises," "comprising," "comprises," "comprising", "contains" or the like means that an element or article prior to this term encompasses element(s) or article(s) listed behind this term and equivalents, but does not preclude the presence of other elements or articles. The term such as "connection," "connected," or the like is not limited to physical or mechanical connection, but can comprise electrical connection, whether directly or indirectly. "Upper," "lower," "left," "right" or the like is only used to describe a relative positional relationship, and when an absolute position of the described object is changed, the relative positional relationship might also be changed accordingly.

The embodiments of the present invention provide a driving method and a driving device of a touch control display, so as to resolve problems such as image smearing and jittering caused by touching during imaging in a display with the touch control functionality.

The driving method and driving device of the touch control display according to the embodiments of the present invention cleans up the panel when a touch signal from the touch control panel is detected by the processor, that is, display panel discharging data is inserted between successive frames of the normal displayed image (the display panel in the normal black mode inserts a black image, and the display panel in the normal white mode inserts a white image), and meanwhile the touch control command is executed so as to resolve the problems such as image smearing and jittering. If no touch event is detected, the normal image data transmission is executed, and no insertion process is executed. When the touch control command is finished, if no subsequent touch event is detected, then no insertion process is performed on the displayed image. It avoids the problems such as image smearing and jittering caused by touching during imaging in the display with the touch control functionality.

The technical solutions according to the embodiments of the invention will be described in further detail by referring to the accompanying drawings as below.

Referring to FIG. 1, the driving method of the touch control display according to the embodiments of the present invention comprises following steps.

S11. a high frequency voltage is applied to a touch control driving electrode of the touch control panel after displaying the present image frame and before displaying the next image frame by driving the touch control display, and a constant voltage is applied to a touch detecting electrode. That is, a touch scanning operation is executed during a touch control period after displaying the present image frame and before displaying the next image frame.

S12. whether or not a touch event occurs on the touch control panel is detected. If a occurred touch event is detected on the touch control panel, then the step S13 is executed; if no touch event is detected on the touch control panel, then the step S16 is executed.

S13. the display panel is controlled to display an inserted image with equal grayscale for each pixel in a prescribed period, i.e., by inserting a new inserted image with equal grayscale for each pixel.

S14. the touch control panel is controlled to execute the touch control command based on the touch signal corresponding to the occurred touch event.

S15. whether or not the touch control command is finished is detected. If the touch control command is not finished, then the step S13 is executed continuously; otherwise the step S16 is executed.

S16. a next frame of the normal image is displayed.

The sequence of the step S13 and the step S14 may be exchanged, or the two steps may be executed simultaneously.

It is noted that, for the built-in touch control panel, the described step S11 applies so that the touch scanning operation is executed after displaying the present image frame and before displaying the next image frame, that is, the touch control period is a time period after displaying the present image frame and before displaying the next image frame. For the external touch control panel, it may continuously apply the touch scanning operation.

The above inserted image may be a black image or a white image, or other images with the grayscale value approximating black or white color.

Figure 2:
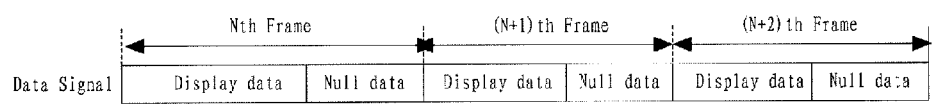
FIG. 2 is a timing chart corresponding to an image frame of the display panel according to an embodiment of the present invention.

Referring to FIG. 2, the timing sequence corresponding to display an image frame on the display panel comprises a display data stage and a null data stage after the display data stage, that is, any two display data stages of adjacent image frames are separated by a period of null data stage. The data signal in the display data stage is the data of displayed image, and the data signal in the null data stage is the null data. Since the image display requires a response time, the null data stage may allow smooth display of the image with the response time, and achieve a better display effect between the image frames.

The step of the processor controlling the display panel to display the inserted image during a prescribed period after displaying the present image frame and before displaying the next image frame has many implementations.

For example, the display panel is controlled to display the inserted image during a prescribed period of the null data stage after inputting the data of the present image frame; or the display panel is controlled to display the inserted image during a prescribed period after the null data stage after inputting the data of the present image frame.

The different prescribed period may have various implementations.

For example, the display panel is controlled to display the inserted image during a period corresponding to outputting one or more pulses by the gate driving circuit of the display panel; or the display panel is controlled to display the inserted image during a period equal to the period for displaying the present image frame.

The above two cases for the different prescribed periods are described as following.

First Embodiment

The display panel is controlled to display the inserted image during a period corresponding to outputting one or more pulses by the gate driving circuit of the display panel.

The processor executes the touch scanning operation during a period after displaying the $N^{th}$ image frame and before displaying the $(N+1)^{th}$ (N=1, 2, 3, 4, . . . ) image frame by driving the display.

Whether or not touch event occurs on the touch control panel is detected.

Figure 3:
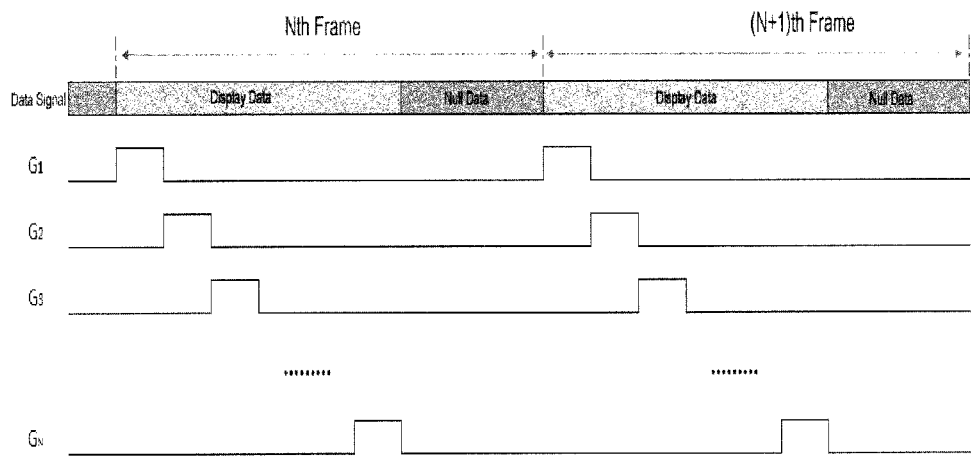
FIG. 3 is a timing chart of the data transmission of the display panel when no touch event occurs corresponding to a first embodiment of the present invention.

If no touch event occurred on the touch control panel is detected, referring to FIG. 3, the processor controls the source driving circuit of the display panel corresponding to each columns of pixels to output normal image data, and the gate driving circuit of the display panel outputs scanning signals line by line. During the time period corresponding to the null data of the data signal shown in FIG. 3, the respective gate driving circuit outputs the low level turn-off signal.

Figure 4:
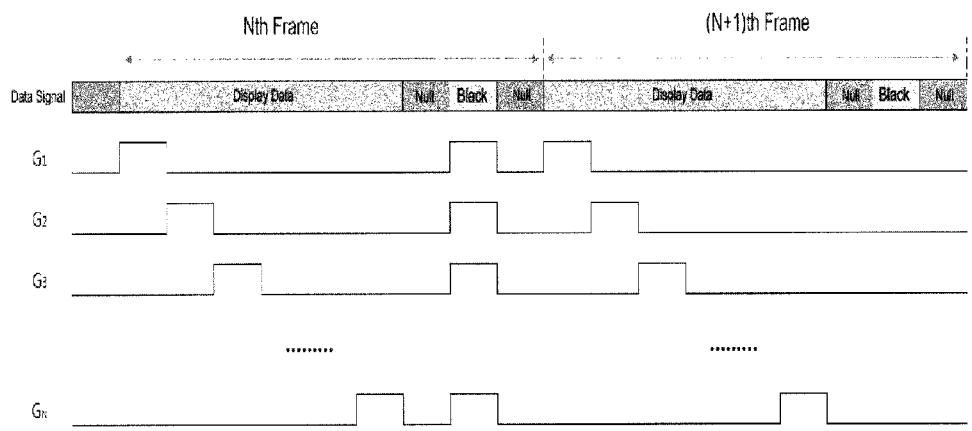
FIG. 4 is a timing chart of the data transmission of the display panel when there is a touch event corresponding to the first embodiment of the present invention.

If a touch event occurred on the touch control panel is detected, referring to FIG. 4, the processor controls the source driving circuit of the display panel to simultaneously output the black image data or the white image data with equal grayscale for each pixel to each data line between two frames (the $N^{th}$ frame and the $(N+1)^{th}$ frame) during a period corresponding to the one pulse, and controls the gate driving circuit output simultaneously scanning signals (i.e. the high level turn-on signals) to each gate scanning line, such that a black image is displayed during a short time (i.e., the period corresponding to one pulse shown in FIG. 4), which facilitates the discharging of the whole display panel. The grayscale of each pixel of the black image or the white image is equal. The processor processes the touch signals corresponding to the occurred touch event at the same time of inserting the black image data or the white image data, or after inserting the black image data or the white image data, and controls the touch control panel to execute the touch control command.

Then whether or not the touch control command is finished is detected. If the touch control command is not finished, then the display panel is controlled to continuously display the inserted image during the prescribed period, until the touch control command is finished. Then the next image frame is displayed.

It is noted that when the touch control display is operated in the normal black mode, the display panel inserts a black image (corresponding to the grayscale value of 0 or approximating 0); when the touch control display is operated in the normal white mode, the display inserts a white image (corresponding to the grayscale value of 255 or approximating 255).

Second Embodiment

The processor controls the display panel to display the inserted image during the period equal to the period for displaying the previous image frame.

The processor executes the touch scanning operation during the time period after displaying the Nth image frame and before displaying the (N+1)th image frame (corresponding to inserting the black data frame in FIG. 5, i.e., during the time period equal to the period for displaying the present image frame) by driving the display.

Whether or not a touch event occurs on the touch control panel is detected.

If no touch event occurred on the touch control panel is detected, in a case that the touch control display is operated in the normal black mode, the source driving circuit of the display panel outputs the normal image data, and the gate driving circuit of the display panel outputs the scanning signals line by line, as shown in FIG. 3.

Figure 5:
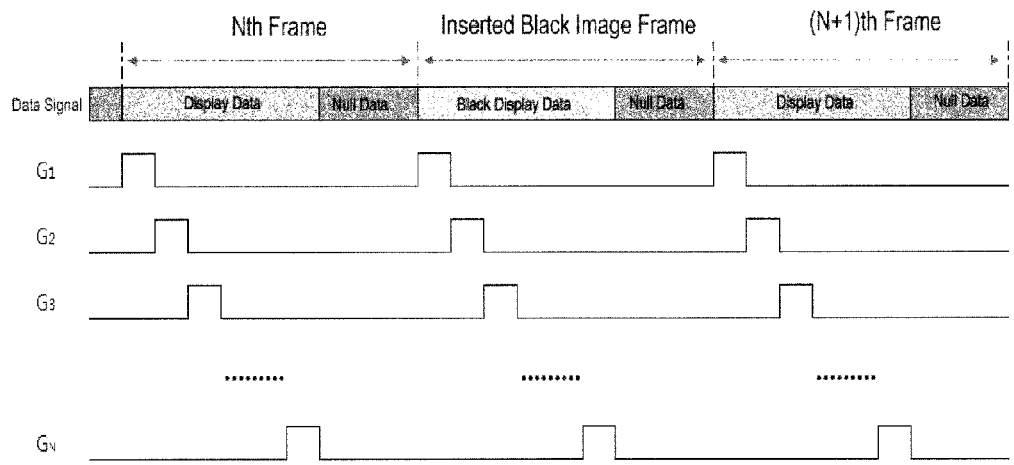
FIG. 5 is a timing chart of the data transmission of the display panel when there is a touch event corresponding to a second embodiment of the present invention.

If a touch event occurred on the touch control panel is detected, referring to FIG. 5, in case that the touch control display is operated in the normal black mode, between two adjacent frames (the Nth frame and the (N+1)th frame), the source driving circuit of the display panel outputs an image frame data of full black image to each data line respectively, and controls the gate driving circuit of the display panel to scan gate scanning lines line by line, so that a frame of the black image is inserted in the whole displayed image, which facilitates the discharging of the whole display panel, i.e., it facilitates to reduce or avoid the image smearing and jittering when a touch signal occurs between the image frames in the whole display panel.

The embodiments of the present invention further provide a device corresponding to the above driving method of the touch control display.

Figure 6:
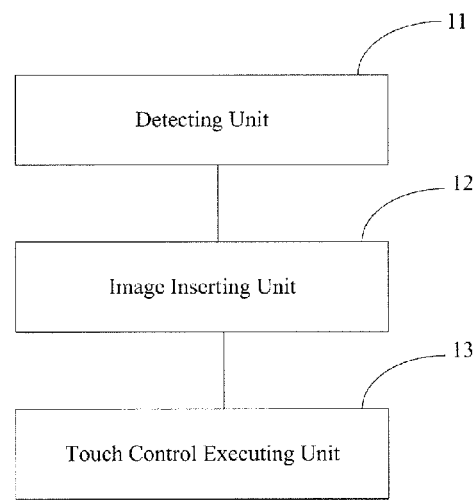
FIG. 6 is a schematic structural view of a driving device of the touch control display according to an embodiment of the present invention.

Referring to FIG. 6, the driving device of the touch control display comprises: a detecting unit 11 configured to detect whether or not a touch occurs currently on the touch control panel after displaying the present image frame and before displaying the next image frame; an image inserting unit 12 configured to control the display panel to display the inserted image with equal grayscale for each pixel during a prescribed period when a touch event is detected by the detecting unit 11; a touch control executing unit 13 configured to control the touch control panel to execute the touch control command based on the touch signal corresponding to the touch event.

For example, the image inserting unit 12 is configured to control the display panel to display the black image or the white image during a prescribed period when a touch event is detected by the detecting unit 11.

For example, the image inserting unit 12 is configured to control the display panel to display a frame of the inserted image during a period corresponding to display the present image frame; or control the display panel to display the inserted image during a period corresponding to output one or more pulses by the gate driving circuit of the display panel.

For example, controlling the display panel to display a frame of the inserted image during a period corresponding to display the present image frame comprises: controlling the source driving circuit of the display panel to output the image data of a frame of the inserted image during the period corresponding to display the present image frame, and controlling the gate driving circuit of the display panel to scan line-by-line.

Controlling the display panel to display the inserted image during the period corresponding to output one or more pulses by the gate driving circuit comprises: during the period corresponding to output one or more pulses by the gate driving circuit, controlling the source driving circuit of the display panel to simultaneously output the image data of a frame of the inserted image to each data line, and controlling the gate driving circuit of the display panel o simultaneously scan each gate scan line.

For example, the image inserting unit 12 is configured to control the display panel to display the inserted image during the prescribed period of the null data stage after inputting the present image frame display data; or control the display panel to display the inserted image after the null data stage after inputting the present frame of image display data.

For example, the touch control executing unit 13 is further configured to detect whether or not the touch control command is finished after controlling the touch control panel to execute the touch control command and before displaying the next image frame. If the touch control command is not finished, the display panel is continuously controlled to display the inserted image, until the touch control command is finished.

In summary, the driving method and driving device of the touch control display according to the embodiments of the present invention avoid the problems such as image smearing and jittering caused by touching during the image display of the display with the touch control functionality by inserting an image with equal grayscale for each pixel when a touch event is detected between two frames of the displayed image.

The above states only the specific embodiments of the present invention, but the scope of the present invention is not limited thereto. The scope of protection of the present invention should be determined by the appending claims.

What is claimed is:

1. A driving method of a touch control display, comprising steps of:
   detecting whether or not a touch event occurs currently on the touch control panel of the touch control display after displaying a present image frame and before displaying a next image frame by driving the touch control display;
   controlling a display panel of the touch control display to display an inserted image with an equal grayscale for each pixel of the display panel during a prescribed period if the touch event is detected, wherein the prescribed period is after a first period for displaying the present image frame and before a second period for displaying the next image frame, and has a duration equal to the first period for displaying the present image frame and the second period for displaying the next image frame; and
   controlling the touch control panel to execute a touch control command based on a touch control signal corresponding to the touch event,
   wherein controlling the display panel to display the inserted image during the prescribed period comprises:
   during the prescribed period, controlling a source driving circuit of the display panel to in turn output image data of a frame of the inserted image with the equal grayscale for each pixel, and controlling a gate driving circuit of the display panel to scan line by line; and
   wherein controlling the display panel of the touch control display to display the inserted image during the prescribed period and controlling the touch control panel to execute the touch control command are performed simultaneously.

2. The method according to claim 1, wherein controlling the display panel to display the inserted image during the prescribed period comprises: controlling the display panel to display a black image or a white image during the prescribed period.

3. The method according to claim 1, wherein controlling the display panel to display the inserted image during the prescribed period comprises:
   controlling the display panel to display the inserted image during a period corresponding to output one or more pulses by the gate driving circuit of the display panel.

4. The method according to claim 3, wherein controlling the display panel to display the inserted image during the period corresponding to output one or more pulses by the gate driving circuit comprises:

during the period corresponding to output one or more pulses by the gate driving circuit, controlling the source driving circuit of the display panel to simultaneously output the image data of the frame of the inserted image to each data line of the display panel, and controlling the gate driving circuit to simultaneously scan each gate scan line of the display panel.

5. The method according to claim 1, wherein controlling the display panel to display the inserted image during the prescribed period comprises:

during the prescribed period in a null data stage after inputting an image data of a frame of the present image, controlling the display panel to display the inserted image.

6. The method according to claim 5, wherein after controlling the touch control panel to execute the touch control command and before displaying the next image frame, it further comprises:

detecting whether or not the touch control command is finished, if the touch control command is not finished, continuously controlling the display panel to display the inserted image, until the touch control command is finished.

7. The method according to claim 1, wherein controlling the display panel to display the inserted image during the prescribed period comprises:

after a null data stage after inputting the image data of a frame of the present image, controlling the display panel to display the inserted image.

8. The method according to claim 7, wherein after controlling the touch control panel to execute the touch control command and before displaying the next image frame, it further comprises:

detecting whether or not the touch control command is finished, if the touch control command is not finished, continuously controlling the display panel to display the inserted image, until the touch control command is finished.

9. The method according to claim 1, wherein after controlling the touch control panel to execute the touch control command and before displaying the next image frame, it further comprises:

detecting whether or not the touch control command is finished, if the touch control command is not finished, continuously controlling the display panel to display the inserted image, until the touch control command is finished.

10. The method according to claim 1, wherein:

the first period for displaying the present image frame includes a display data stage and a first null data stage, and the present image frame is displayed during the display data stage; and the prescribed period includes a black display data stage and a second null data stage, and the inserted image is displayed during the black display data stage.

11. A driving device of a touch control display, comprising:

a detecting unit configured to detect whether or not a touch event occurs on a touch control panel of the touch control display after displaying a present image frame and before displaying a next image frame;

an image inserting unit configured to control a display panel of the touch control display to display the inserted image with an equal grayscale for each pixel of the display panel during a prescribed period when a touch event is detected by the detecting unit, wherein the prescribed period is after a first period for displaying the present image frame and before a second period for displaying the next image frame, and has a duration equal to the first period for displaying the present image frame and the second period for displaying the next image frame; and a touch control executing unit configured to control the touch control panel to execute a touch control command based on the touch event, wherein the image inserting unit controls the display panel to display the inserted image during the prescribed period comprising:

during the prescribed period, controlling a source driving circuit of the display panel to in turn output image data of a frame of the inserted image with the equal grayscale for each pixel, and controlling the gate driving circuit to scan line by line; and wherein the image inserting unit simultaneously controls the display panel of the touch control display to display the inserted image during the prescribed period and controls the touch control panel to execute the touch control command.

12. The driving device according to claim 11, wherein the image inserting unit is configured to control the display panel to display a black image or a white image during the prescribed period when the touch event is determined by the detecting unit.

13. The driving device according to claim 11, wherein the image inserting unit controls the display panel to display the frame of the inserted image during a period corresponding to output one or more pulses by the gate driving circuit of the display panel.

14. The device according to claim 13, wherein controlling the display panel to display the inserted image during the period corresponding to output the one or more pulses by the gate driving circuit comprises:

during the period corresponding to output the one or more pulses by the gate driving circuit, controlling a source driving circuit of the display panel to simultaneously output the image data of a frame of the inserted image to each data line of the display panel, and controlling the gate driving circuit to simultaneously scan each gate scan line of the display panel.

15. The device according to claim 11, wherein the image inserting unit controls the display panel to display the inserted image during the prescribed period in a null data stage after inputting the image data of the frame of the inserted image.

16. The device according to claim 11, wherein the image inserting unit controls the display panel to display the inserted image after a null data stage after inputting the image data of a frame of the inserted image.

17. The device according to claim 11, wherein the touch control executing unit is further configured to detect whether or not the touch control command is finished after controlling the touch control panel to execute the touch control command and before displaying the next image frame, if the touch control command is not finished, then the touch control executing unit continuously controls the display panel to display the inserted image until the touch control command is finished.

* * * * *